May 22, 1962   J. H. O'QUINN   3,035,651
WHEELED TRACTOR CONSTRUCTION
Filed Nov. 20, 1959   2 Sheets-Sheet 1

Jackson H. O'Quinn
INVENTOR.

BY *Clarence A. O'Brien*
and *Harvey B. Jackson*
Attorneys

May 22, 1962 J. H. O'QUINN 3,035,651
WHEELED TRACTOR CONSTRUCTION
Filed Nov. 20, 1959 2 Sheets-Sheet 2
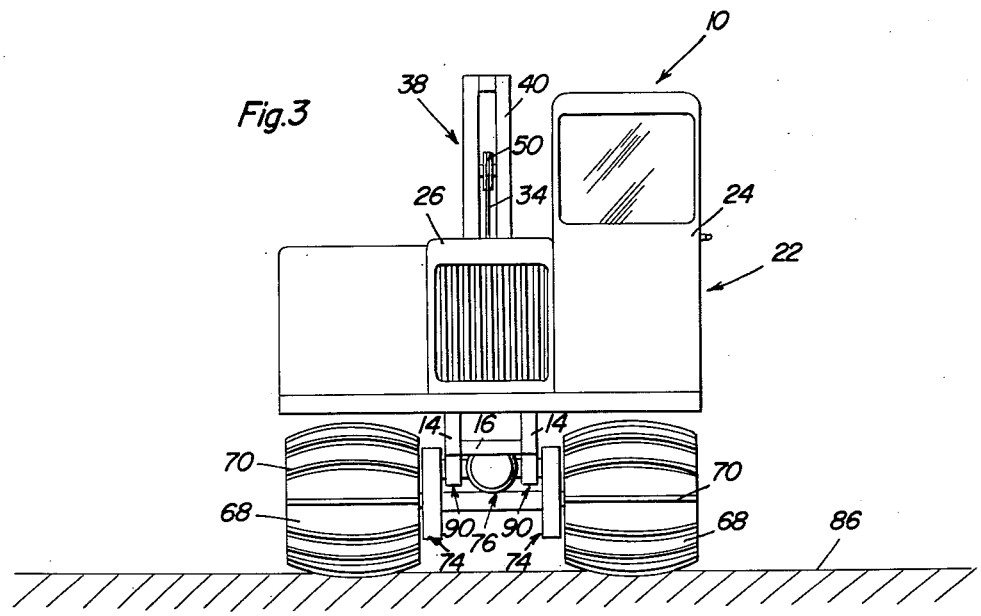
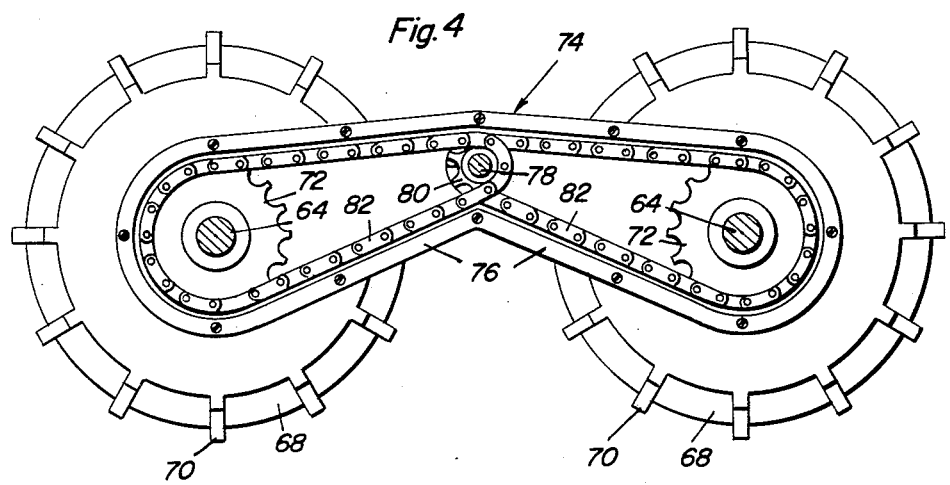
Jackson H. O'Quinn
INVENTOR.

United States Patent Office 3,035,651
Patented May 22, 1962

3,035,651
WHEELED TRACTOR CONSTRUCTION
Jackson H. O'Quinn, Rte. 3, Brunswick, Ga.
Filed Nov. 20, 1959, Ser. No. 854,302
2 Claims. (Cl. 180—6.2)

This invention relates to a wheeled tractor construction and more particularly to a tractor construction which is specifically adapted to be used in the handling of logs in the lumber industry.

Heretofore, crawler type of tractors have been used for the purpose of dragging logs from where they have been cut down to the point at which they are shipped from the forest and this use of crawler type tractors has resulted in numerous breakdowns as well as irreparable damage to the smaller trees in the forest.

The crawler type of tractor tread is very susceptible to jamming and breakage due to the rough terrain over which such tractors must travel and the crawler treads have to be rebuilt frequently which in many cases includes the replacement of track pins and bushings, guide rollers, rails, idler wheels and sprocket wheels. This frequent overhauling of crawler type tractor treads is of course very costly and the crawler type of treads can cause serious damage to the small tree sprouts in the forest. Further, the crawler type of tractor treads require considerably more power inasmuch as these type of treads have many moving parts which cannot be maintained properly lubricated. The entrance of dirt, mud and other foreign materials as well as rocks and small limbs quite often cause damage to the crawler type of tractor and render it immobile. If such a tractor is immobilized along a narrow trail, it sometimes forces other tractors to cease their activities inasmuch as the trail is blocked.

It is therefore the main object of this invention to provide a wheeled tractor specifically adapted for logging purposes which will be capable of being steered in the same manner as a crawler type of tractor for maneuverability but one which will not require the additional power demanded by a crawler type of tractor.

A further object of this invention, in accordance with the preceding object, is to provide a wheeled tractor construction having a plurality of wheels therefor with driving power being operatively connected to each of the wheels whereby sufficient traction will be afforded by the tractor.

Still another object of this invention is to provide a wheeled tractor construction having an upstanding suspension boom thereon with a flexible cable operatively connected thereto powered by a winch whereby one end of a log may be raised above the ground during the process of dragging the log to the shipping point or sawmill so that the friction between the log and the ground will be maintained at a minimum.

Still another object of this invention is to provide a wheeled tractor construction for logging utilizing a type of pneumatic wheel which is also adapted to be filled with water in order to afford more traction in the form of additional weight if the same is desired.

Yet another object of this invention is to provide the ground engaging surfaces of each of the wheels with circumferentially spaced radially and transversely extending ribs whereby each wheel will afford maximum traction.

A further object, in accordance with the preceding objects, is to provide a wheeled tractor construction having wheels thereon whose ground engaging surfaces are transversely convexed whereby the wheeled tractor construction may be steered in the same manner as a crawler type of tractor, the transversely convexed ground engaging surfaces of each of the wheels adapting them for lateral movement when the tractor is executing a turn.

A final object to be specifically enumerated herein is to provide a wheeled tractor construction which will conform to conventional forms of manufacture, be highly mobile in the terrain usually adjacent a logging operation and easy to operate so as to provide a device that will be economically feasible, highly desirable in the logging industry and operable by persons having knowledge of how to operate a crawler type of tractor.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 3 is a side elevational view of the tractor construction as seen from the left side of FIGURE 1; and FIGURE 4 is a transverse vertical sectional view taken substantially upon the plane indicated by the section line 4—4 of FIGURE 2.

Figure 1:
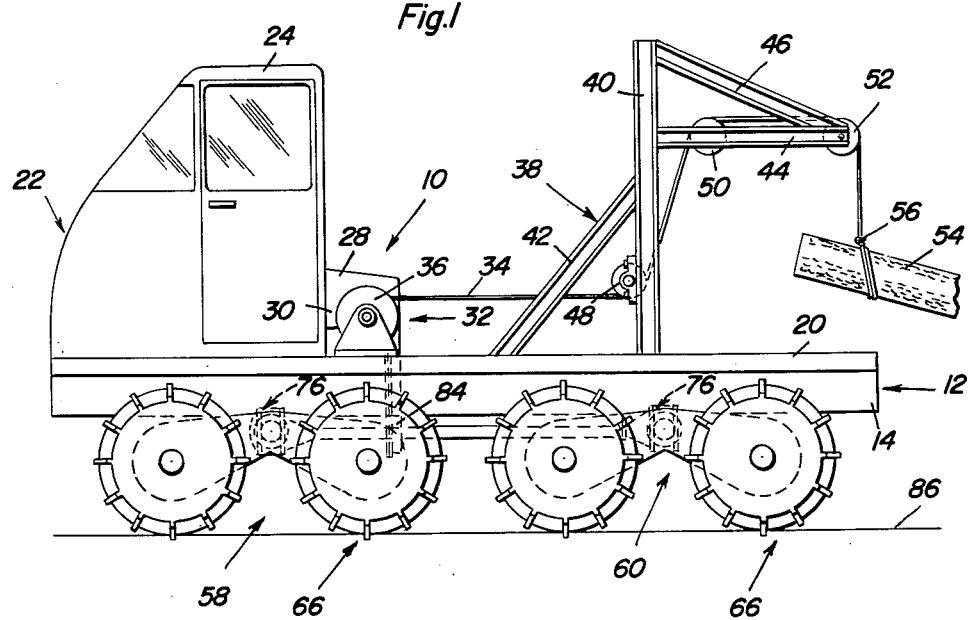
FIGURE 1 is a side elevational view of the wheeled tractor construction, the front end of a log being shown elevated in position ready for transport.
Figure 2:
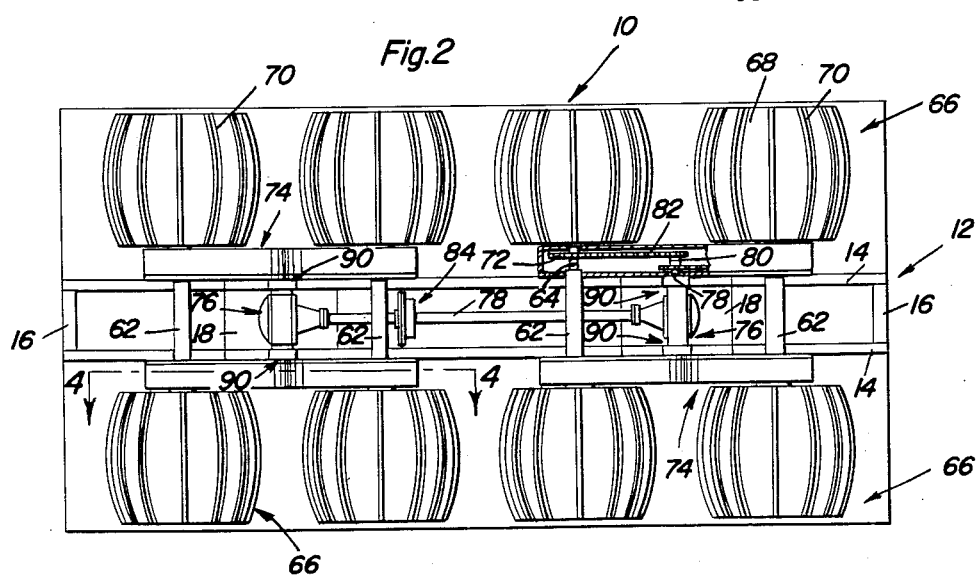
FIGURE 2 is a bottom plan view of the wheeled tractor illustrated in FIGURE 1.

Referring now more specifically to the drawings the numeral 10 generally designates the wheeled tractor construction comprising the instant invention which includes a frame generally designated by the reference numeral 12 having a pair of longitudinal frame members 14 interconnected by means of transverse end members 16 and intermediate transverse members 18.

The frame 12 has a flooring 20 secured thereto which has disposed on its forward end a cab generally designated by the reference numeral 22 which includes a driver's portion 24 and a motor housing 26 in which there is disposed a prime mover (not shown). The prime mover has operatively connected thereto a transmission (not shown) which is disposed in transmission housing 28 from which output shaft 30 extends. The end of the output shaft 30 remote from the transmission (not shown) is operatively connected to a winch generally referred to by the reference numeral 32 which has one end of a flexible cable 34 wound about the drum 36 thereof.

Also disposed on the flooring 20 is an upstanding suspension boom assembly generally designated by the reference numeral 38 which includes a standard 40 having an inclined bracing member 42 secured between the intermediate portion of the standard 40 and the flooring 20 a spaced distance from the bottom of the standard 40. A horizontal support beam 44 has one end secured to the standard 40 and has its outer end braced to the upper end of the standard 40 by means of inclined bracing member 46. A first pulley assembly designated by the reference numeral 48 is secured to the standard 40 and a second pulley 50 is journaled on the horizontal support beam 44 adjacent the standard 40 while a third pulley 52 is journaled on the outer end of the horizontal support beam 44. The other end of the flaxible cable 34 is entrained over pulleys 48, 50 and 52 and is provided with a means on its free end adapted for engagement with a log 54. The log engaging means disposed on the free end of the cable 34 comprises a hook 56 whereby the end portion of the flexible cable 34 may be encircled about a log 54 and the hook 56 engaged with that portion of the flexible cable 34 intermediate the log 54 and the third pulley 52.

The frame 12 of the wheeled tractor construction 10 is provided with front and rear wheeled suspension assemblies generally designated by the reference numerals 58 and 60 respectively. Each of the suspension assemblies 58 and 60 include a pair of spaced parallel axle housings 62 having a pair of axially aligned axles 64 journaled therein. The remote ends of each pair of aligned axles 64 have secured thereto a wheel generally designated by the reference numeral 66.

Each of the wheels is provided with a wide ground engaging surface 68 which is transversely convexed and provided with circumferentially spaced radially and transversely extending ribs 70.

The remote ends of the axles 64 project beyond the opposite ends of the corresponding axle housing 62 and are provided with a sprocket wheel 72.

Each suspension assembly 58 and 60 is provided with a pair of transmission housings generally designated by the reference numeral 74 which rotatably journals the corresponding ends of the axles 64. A differential assembly generally designated by the reference numeral 76 is disposed between each pair of axle housings 72 and the differential assemblies 76 are operatively connected by means of a drive shaft 78. Each differential 76 is provided with a pair of outwardly extending output shafts 78 which have their remote ends journaled in the corresponding transmission housing 74 intermediate the corresponding ends of the axles 64 journaled therein. The remote ends of the output shafts 78 are provided with a pair of sprocket wheels 80 each of which is operatively connected to the corresponding sprocket wheel 72 by means of a chain 82. With attention directed more particularly to FIGURE 4 it will be noted that each of the transmission housings 74 is provided with a pair of upwardly inclined bottom walls 76 which converge at a point a spaced distance below the corresponding output shaft 78 and above the longitudinal axis of the axles 64. It is further to be noted that the wheels 66 on one side of each of the suspension assemblies 58 and 60 are spaced apart a distance less than that which would enable a round object such as as log to be positioned between the wheels on the supporting surface for the wheels and engage the bottom walls of the corresponding transmission housing 74. Therefore, the wheeled vehicle is capable of travelling over round objects such as logs without the log engaging one of the transmission housings 74 and lifting the wheels 66 carried by that housing from the supporting surface.

The drive shaft 78 is operatively connected to the transmission (not shown) in the transmission housing 28 by means of a power take-off assembly generally designated by the reference numeral 84.

In operation, the flexible cable 34 is extended and engaged with the adjacent end of the log 54 as heretofore set forth whereupon the winch 32 may be operated to raise that end of the log 54 above the supporting surface 86. The vehicle 10 may then be placed in gear to haul the log 54 to the desired location. It is to be understood that each of the output shafts 78 is provided with a means whereby they may be disconnected from the corresponding differential assembly 76 and may be braked in order to turn the vehicle 10. The clutching and braking mechanism is generally designated by the reference numeral 90 and inasmuch as this construction may be conventional and does not represent the novel feature of the invention, further expansion of this feature is deemed unnecessary.

It may thus be seen that herein described is a wheeled tractor construction which is specifically adapted for use in logging operations wherein it affords a means to lift one end of a log being dragged above the supporting surface and is provided with a novel wheeled suspension assembly which in many ways adapts the wheeled tractor construction 10 specifically for logging purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A wheeled tractor construction for logging comprising a frame, a front wheeled suspension assembly supporting one end of said frame, a rear wheeled suspension assembly supporting the other end of said frame, each of said suspension assemblies comprising a pair of spaced parallel axle housings secured to said frame, a pair of axially aligned axles journaled in each of said housings and having ground engaging wheels secured to the remote ends thereof, said remote ends projecting beyond the opposite ends of said housing and each having sprocket wheels secured thereto between said housings and said wheels, a differential mechanism having a pair of output shafts disposed between the axles of each suspension assembly, a drive shaft operatively connecting said differential mechanism, a pair of transmission housings rotatably journaling the opposite ends of said axles and said output shafts of each suspension assembly, a pair of sprocket wheels disposed on the end of each of said output shafts with each being aligned with a sprocket wheel on one of the corresponding axle ends, means operatively connecting each of said shaft sprocket wheels with the corresponding axle sprocket wheels, motor means for effecting rotation of said drive shaft, means for individually disengaging each of said output shafts from the corresponding differential assembly and for individually braking each of said output shafts.

2. The combination of claim 1 wherein said output shafts are disposed in a horizontal plane a spaced distance above the horizontal plane in which the corresponding axle ends are disposed, said transmission housings each having a pair of upwardly inclined bottom walls converging to an apex a spaced distance below the corresponding output shaft and in general vertical alignment therewith but above the longitudinal axes of the corresponding axles, said wheels on one side of each of said suspension assemblies being spaced apart a distance less than that which would enable a round object such as a log to be positioned between said wheels on the supporting surface for said wheels and engage said bottom walls of said transmission housing.

References Cited in the file of this patent
UNITED STATES PATENTS

| | | |
|---|---|---|
| 2,821,311 | Screws | Jan. 28, 1958 |
| 2,821,949 | Uyehara | Feb. 4, 1958 |
| 2,906,358 | Tuker | Sept. 29, 1959 |